No. 620,748. Patented Mar. 7, 1899.
L. H. DILLMAN.
NUT LOCK.
(Application filed June 1, 1898.)

(No Model.)

Witnesses
Chas. H. Manning
Edwin P. Nichols

Inventor
Lee H. Dillman
By Rich H. Manning
Att'y

UNITED STATES PATENT OFFICE.

LEE H. DILLMAN, OF PARKLAND, OKLAHOMA TERRITORY.

NUT-LOCK.

SPECIFICATION forming part of Letters Patent No. 620,748, dated March 7, 1899.

Application filed June 1, 1898. Serial No. 682,314. (No model.)

*To all whom it may concern:*

Be it known that I, LEE H. DILLMAN, a citizen of the United States, residing at Parkland, in the county of Lincoln, Oklahoma Territory, have invented certain new and useful Improvements in Nut-Locks; and I do hereby declare that the following is a full, clear, and exact description of the invention, such as will enable others to make and use the same, reference being had to the accompanying drawings, forming a part of this specification.

My invention is designed to prevent the self-releasing or turning of the nut upon the bolt when secured in position thereon; and it consists in the novel construction and combination of parts, such as will be first fully described and specifically pointed out in the claim.

Figure 1:
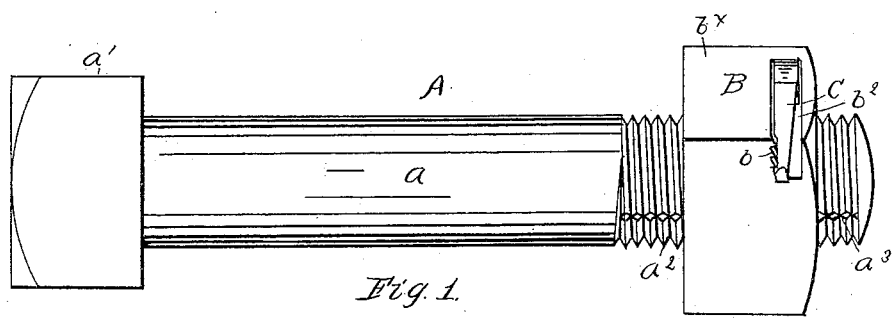
Figure 2:
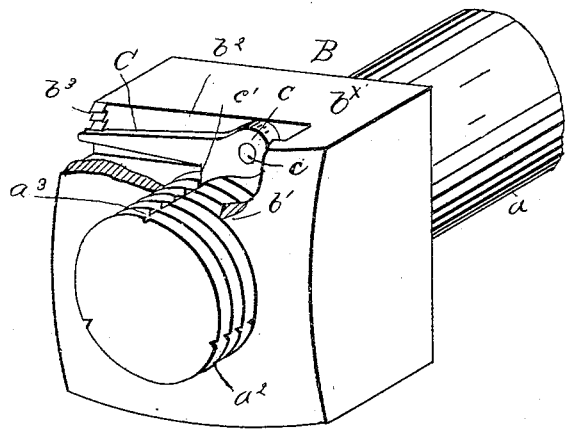

In the drawings, Figure 1 is a side view of a bolt and nut with the invention applied thereto. Fig. 2 is a detail view in perspective of the threaded end of the bolt, showing the longitudinal groove, also showing the locking-nut in position upon the bolt with a portion of the nut broken away to show the locking device.

Similar letters of reference indicate corresponding parts in both figures.

Referring to the drawings, A represents the bolt, which consists of the shank $a$ and the head $a'$, a portion of one end of the shank being screw-threaded, as at $a^2$. In the screw-threaded end of the shank $a$ is a V-shaped groove $a^3$, which extends from the end of shank $a$ in the longitudinal direction of the bolt toward the head $a'$ and intersecting the threads of the bolt. Other grooves are made in the shank $a$, at short distances from each other, which intersect with the screw-threads, as described, of the groove $a^3$.

B represents a square or four-sided nut having a screw-threaded opening $b'$ fitted to the screw-threads $a^2$ of shank $a$. In one of the sides $b$ of the nut B is a slot $b^2$, extending in the direction of and intersecting with the opening $b'$ in nut B and also extending through an adjacent side of the nut a corresponding distance. Within the slot $b^2$, opposite the screw-threaded end of the bolt A, is a locking-lever C, pivoted at one end to the pivot $c$, secured to the opposite sides of slot $b^2$ in the direction of one of the sides of nut. The other end of the lever C extends in the direction of the opposite side of the nut through which the slot extends and a short distance beyond the outer surface of the said side of the nut. The sides of the lever C incline toward each other in the direction of the outer vibrating end of said lever, and the lever is made of suitable material to yield or spring. With the under side portion of lever C, a short distance from the pivot $c$ in the direction of the vibrating end of said lever, is a downward V-shaped projection or tooth $c'$, which extends within the slot $a^3$ in the screw-threaded end of shank $a$ of the bolt.

In the slot $b^2$, near one side of nut B and extended from the side of said slot opposite the outer vibrating end of lever C, are ratchet-teeth $b^3$, which form a keeper, and with which teeth the said end of lever C is adapted to engage.

In operation and when the nut is turned upon the end of the bolt the lever is raised in position in the slot a slight distance to permit the tooth to avoid the grooves in the shank $a$. As soon as the position of the nut on the bolt is such as to clamp the object between the nut and head of bolt the tooth $c'$ is brought into position opposite one of the grooves $a^3$ in shank $a$. The outer vibrating end of lever C is caused to engage with one of the ratchet-teeth $b^3$, which movement causes the tooth $c'$ to enter the groove in the bolt and the nut is secured from movement. In engaging with the ratchet-teeth the lever yields to permit of a slight lateral movement, and the downward pressure upon the lever forces the tooth within the groove with a degree of force which is capable of being increased.

The invention is applicable to all kinds of nut-bolts, with or without threads, on the respective nut and shank. The nut may also be applied to the shank of any bolt, particularly where the threads are worn from use. In this instance a depression is made in the shank of the bolt to admit the tooth $c'$, which will hold the nut securely upon the shank.

Having fully described my invention, what I now claim as new, and desire to secure by Letters Patent, is—

The combination with a bolt having a longitudinal groove, of a nut having a suitable slot in one side thereof a yielding locking-lever pivoted at one end to said nut, within said slot, and near one side of said nut, and the other end extending in the direction of the opposite side of such nut, a tooth connected with the under side portion of said lever, a short distance from its pivotal end and in the direction of the vibrating end of said lever, and adapted to enter the groove in said bolt, and ratchet-teeth in said nut projecting from one side of the slot therein engaging with the yielding lever.

LEE H. DILLMAN.

Witnesses:
J. T. STRIDER,
F. A. NIBLACK.